United States Patent
Bonn et al.

(10) Patent No.: US 6,738,908 B1
(45) Date of Patent: May 18, 2004

(54) GENERALIZED NETWORK SECURITY POLICY TEMPLATES FOR IMPLEMENTING SIMILAR NETWORK SECURITY POLICIES ACROSS MULTIPLE NETWORKS

(75) Inventors: David Wayne Bonn, Everett, WA (US); Nick Takaski Marvais, Shoreline, WA (US)

(73) Assignee: WatchGuard Technologies, Inc., Seattle, WA (US)

( * ) Notice: Subject to any disclaimer, the term of this patent is extended or adjusted under 35 U.S.C. 154(b) by 0 days.

(21) Appl. No.: 09/306,646

(22) Filed: May 6, 1999

(51) Int. Cl.[7] ............................................. G06F 15/177
(52) U.S. Cl. ..................... 713/201; 707/9; 709/229; 709/225; 709/245; 713/164; 713/159
(58) Field of Search ..................... 707/9; 711/164; 713/152, 200, 201, 192, 166, 164, 159; 709/229, 225, 245; 340/5, 74; 380/30, 4, 23, 25, 49

(56) References Cited

U.S. PATENT DOCUMENTS

| | | | |
|---|---|---|---|
| 4,677,588 A | * 6/1987 | Benjamin et al. | 709/228 |
| 5,377,354 A | * 12/1994 | Scannell et al. | 709/103 |
| 5,577,209 A | 11/1996 | Boyle et al. | |
| 5,848,233 A | * 12/1998 | Radia et al. | 713/201 |
| 5,968,176 A | 10/1999 | Nessett et al. | |
| 6,167,445 A | * 12/2000 | Gai et al. | 709/223 |
| 6,243,747 B1 | * 6/2001 | Lewis et al. | 709/220 |
| 6,449,650 B1 | * 9/2002 | Westfall et al. | 709/228 |
| 6,530,024 B1 | * 3/2003 | Proctor | 713/201 |

FOREIGN PATENT DOCUMENTS

WO    WO 98/54644    12/1998

* cited by examiner

*Primary Examiner*—Ly V. Hua
(74) *Attorney, Agent, or Firm*—Perkins Coie LLP

(57) ABSTRACT

The present invention is directed to a facility for adapting a network security policy model for use in a particular network. The facility retrieves the network security policy model, which comprises network security rules each specified with respect to one or more aliases. Each alias represents a role in a network for one or more network elements. The facility receives, for each alias included in the network security policy model, a list of one or more network elements in the network serving the role represented by the alias. The facility replaces each alias in the network security policy model with the received list of network security devices specified for the alias to produce a network security policy adapted for use in a network.

16 Claims, 18 Drawing Sheets

GENERALIZED NETWORK SECURITY POLICY TEMPLATES FOR IMPLEMENTING SIMILAR NETWORK SECURITY POLICIES ACROSS MULTIPLE NETWORKS

TECHNICAL FIELD

The present invention is directed to the field of automated network security.

BACKGROUND OF THE INVENTION

Network security devices provide various types of network security services to a network, such as a local area network connected to the Internet. For example, a network security device may perform access control and traffic monitoring and logging. Access control refers to the regulation of network traffic based upon its type, content, source, and/or destination. For example, access control services of a network security device can be employed to prevent email traffic from sources on the Internet from reaching computer systems inside the network other than a designated mail host computer system. Traffic monitoring and logging refers to observing network traffic, and storing important observations about the network traffic in a log. As an example, traffic monitoring and logging services of a network security device can be employed to log all unsuccessful attempts from sources on the Internet to access a server in the network containing sensitive information.

Unfortunately, in order to perform such functions, conventional network security devices generally must be configured manually, typically on-site at the location of the network. Such configuration can be extremely time-consuming. Also, because of the nature of typical configuration processes, they generally must be performed by a technical specialist whose time is both scarce and expensive. It is especially important that the configuration process be performed correctly, since misconfiguration of a security device often leaves the network that is to be protected by the security device vulnerable to attack or other abuse.

These shortcomings of conventional network security device configuration processes tend to make the installation and use of a network security device difficult and/or expensive. Accordingly, a streamlined, more highly automated configuration process that is capable of correctly configuring network security devices would make the proper use of such network security devices more accessible, and would therefore have significant utility.

SUMMARY OF THE INVENTION

The present invention provides a software facility for implementing similar network security policies across multiple networks ("the facility"). Each network is a collection of network elements, including a network security device that protects the network by implementing a network security policy (hereinafter simply "policy") within the network. While Firebox II network security devices provided by WatchGuard Technologies, Inc., of Seattle, Wash. are suggested for use with the facility, the facility preferably also operates with other network security devices available from other sources.

The policy implemented in a particular network comprises a set of rules for managing network traffic. These rules are specified in terms of specific network elements, such as user workstations, servers, routers, and printers, that perform certain functions, or "roles." For example, a rule in a network security policy for a particular network may specify that all email traffic must flow through a network element having a particular network address that is specifically configured as a mail host. In a sense, these rules establish trust relationships between specific network elements, or groups thereof.

The facility preferably provides a user interface for constructing one or 25 more network security policy templates (hereinafter simply "templates") that can each be used to generate similar policies for any number of specific networks. A template contains rules expressed in terms of "aliases," rather than in terms of specific network elements. For example, a template may include a rule specifying that all email traffic must flow through a "MailHost" alias that is not associated with a particular network address.

To generate a policy for a particular network from a template, the facility uses a profile of the network that maps the aliases occurring in the template to specific network elements within the network. For example, the network profile for a particular network maps the "MailHost" alias to a particular network element of the network having a particular network address. The facility preferably provides a user interface that makes it convenient for a user to generate network profiles.

The facility uses the profile for the network to replace occurrences of aliases in the template with the addresses of the corresponding specific network elements. The facility preferably sends the resulting network-specific policy to the network security device of the network for implementation. In certain embodiments, the policy may be further modified before transmission to the networks security device.

This process can be repeated to generate policies for each of a number of other networks. At a later time, the underlying template can be revised to add or change rules. Together with the network profiles, this revised template can be used to automatically generate revised policies corresponding to the revised template for all of the networks.

The facility is especially well suited for use by Internet service providers and other organizations responsible for providing network security to a large number of networks, as it enables these organizations to configure the network security devices for additional networks at a very low cost. The facility also enables such organizations to efficiently update the configuration of a large number of operating network security devices by merely modifying and reapplying one or more templates.

DETAILED DESCRIPTION OF THE INVENTION

Figure 1A:
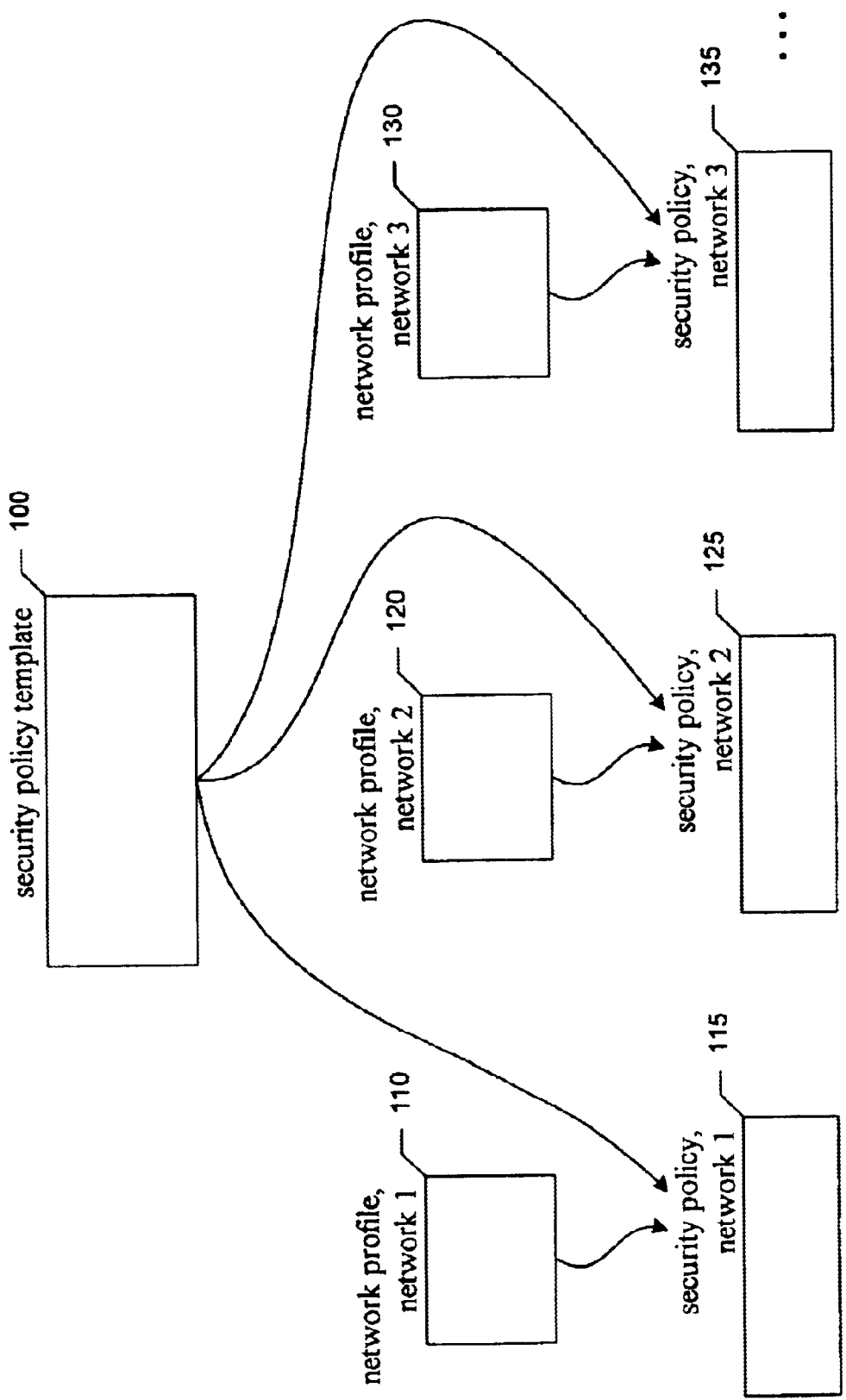
FIG. 1A is a conceptual diagram illustrating the generation of security policies for each of several networks from a single security policy template.

The present invention provides a software facility for implementing similar network security policies across multiple networks ("the facility"). Each network is a collection of network elements, including a network security device that protects the network by implementing a network security policy (hereinafter simply "policy") within the network. While Firebox II network security devices provided by WatchGuard Technologies, Inc., of Seattle, Wash. are suggested for use with the facility, the facility preferably also operates with other network security devices available from other sources.

The policy implemented in a particular network comprises a set of rules for managing network traffic. These rules are specified in terms of specific network elements, such as user workstations, servers, routers, and printers, that perform certain functions, or "roles." For example, a rule in a network security policy for a particular network may specify that all email traffic must flow through a network element having a particular network address that is specifically configured as a mail host. In a sense, these rules establish trust relationships between specific network elements, or groups thereof.

The facility preferably provides a user interface for constructing one or more network security policy templates (hereinafter simply "templates") that can each be used to generate similar policies for any number of specific networks. A template contains rules expressed in terms of "aliases," rather than in terms of specific network elements. For example, a template may include a rule specifying that all email traffic must flow through a "MailHost" alias that is not associated with a particular network address.

To generate a policy for a particular network from a template, the facility uses a profile of the network that maps the aliases occurring in the template to specific network elements within the network. For example, the network profile for a particular network maps the "MailHost" alias to a particular network element of the network having a particular network address. The facility preferably provides a user interface that makes it convenient for a user to generate network profiles.

The facility uses the profile for the network to replace occurrences of aliases in the template with the addresses of the corresponding specific network elements. The facility preferably sends the resulting network-specific policy to the network security device of the network for implementation. In certain embodiments, the policy may be further modified before transmission to the networks security device.

This process can be repeated to generate policies for each of a number of other networks. At a later time, the underlying template can be revised to add or change rules. Together with the network profiles, this revised template can be used to automatically generate revised policies corresponding to the revised template for all of the networks.

The facility is especially well suited for use by Internet service providers and other organizations responsible for providing network security to a large number of networks, as it enables these organizations to configure the network security devices for additional networks at a very low cost. The facility also enables such organizations to efficiently update the configuration of a large number of operating network security devices by merely modifying and reapplying one or more templates.

FIG. 1A is a conceptual diagram illustrating the generation of security policies for each of several networks from a single security policy template. Using the facility, the user generates a security template 100. Then, for each of a number of different networks 115, 125, 135, etc., the user uses the facility to generate a network profile specifically for implementation in the network. These network profiles are shown as network profiles 110, 120, 130, etc. In order to generate the security policy for each network, the facility combines the security policy template with the network profile for that network. For example, in order to create security policy 115 for network 1, the facility combines the security policy template 100 with network profile 110 for network 1.

Figure 1B:
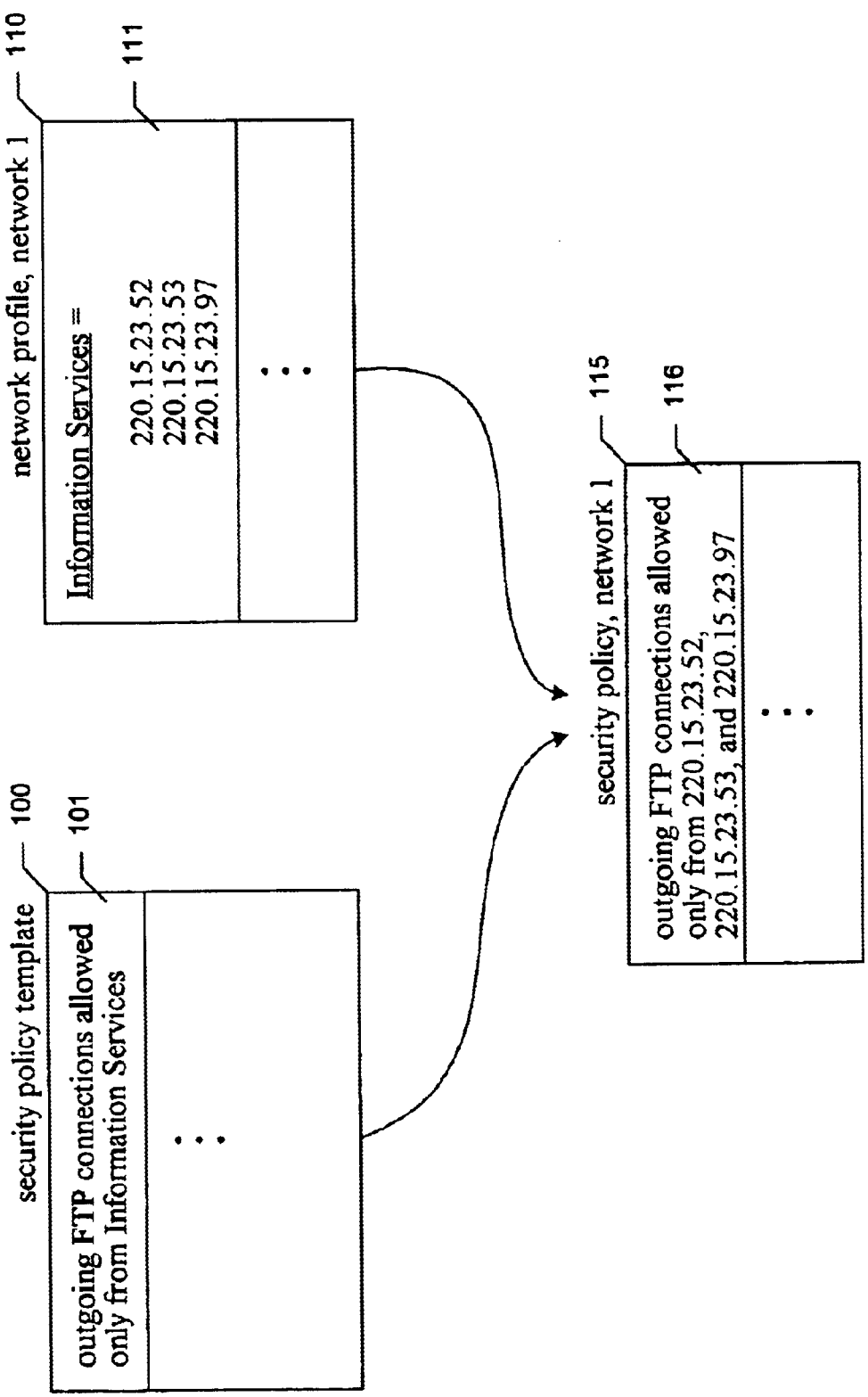
FIG. 1B is a conceptual diagram illustrating the creation of a security policy in greater detail.

FIG. 1B is a conceptual diagram illustrating the creation of a security policy in greater detail. In particular, FIG. 1B shows the creation of security policy 115 for network 1 shown in FIG. 1A. FIG. 1B shows that the security policy template 100 contains a number of security policy rules, including security policy rule 101. Security policy rule 101 specifies that outgoing FTP connections are allowed only from network elements defined as being within the "InformationServices" alias. While only one security policy rule is shown in security policy template 100 to simplify this example, security policy templates often have a larger number of security policy rules.

The network profile 110 for network 1 contains a definition of the "InformationServices" alias 111. It can be seen that this definition defines the "InformationServices" alias to include the network elements at the following IP addresses:

220.15.23.52
220.15.23.53
220.15.23.97

In general, a network profile contains an alias definition like alias definition 111 for each alias used in the security policy template.

When the security policy template 100 and the network profile 110 for network 1 are combined to create the security policy 115 for network 1, the facility replaces the "InformationServices" alias in rule 101 with the network addresses listed for the "InformationServices" alias in definition 111. Doing so produces rule 116 in the security policy 115 for network 1, which indicates that outgoing FTP connections are allowed only from the network elements having IP addresses 220.15.23.52, 220.15.23.53, and 220.15.23.97. In the same manner, for each additional rule in security policy template 100, the facility replaces each occurrence of an alias with the network addresses of the network elements defined to be within the alias in the network profile 110 for network 1. As a result, the rules in security policy 115 for network 1, which are to be implemented in network 1, specifically refer to network elements within network 1. In this sense, they differ from the rules in security policies 125 and 135, which specifically refer to network elements within networks 2 and 3, respectively.

Figure 2:
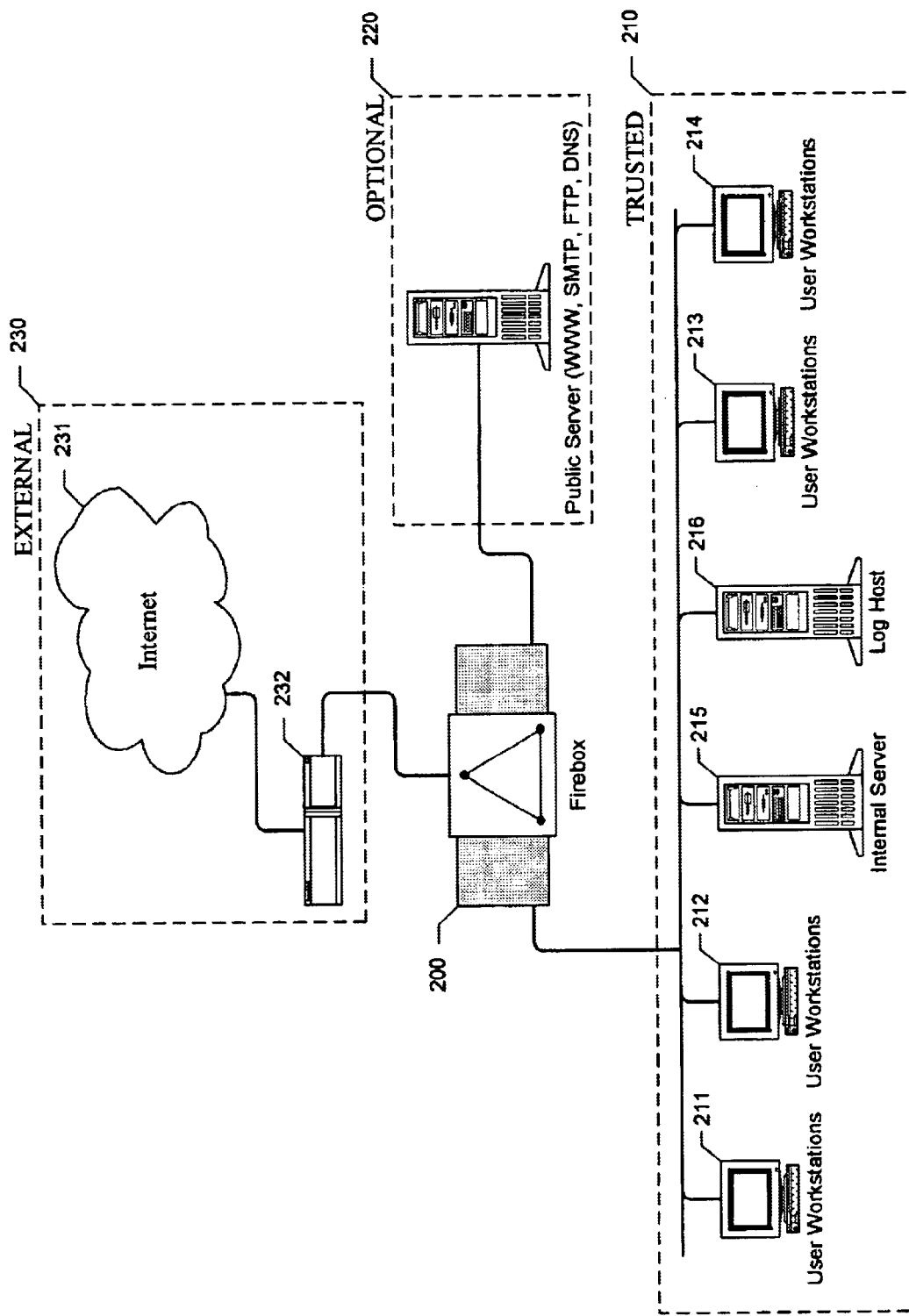
FIG. 2 is a network diagram showing a sample network for which the facility generates a policy.

FIG. 2 is a network diagram showing a sample network for which the facility generates a policy. The network is described relative to a network security device 200. The network security device 200 has three interfaces, through which the network security device is connected to three different "zones": a trusted zone 210, an optional zone 220, and an external zone 230. The trusted zone 210 contains the elements of the network that, in general, receive the most extensive protection from the network security device. The trusted zone contains such network elements as user workstations 111–114, and internal server 215, and a log host 216. Each of the network elements in the trusted zone is preferably identified by a unique address, such as an Ethernet address or an IP address. The external zone 230 is considered to include the entirety of the Internet 231, as well as any intermediate network elements, such as intermediate network element 232. In general, network elements in the external zone are not within the control of the operator of the network. Optional zone 220 includes network elements operated by the operators of the network that must be available, at least in certain respects, to network elements of the Internet. An example of such an element is public server 221, which may provide services such as world wide web serving, email serving, file transfer serving, and domain name serving. The rules in the policy implemented by the network security device 200 relate to traffic flowing between network elements in the three zones shown.

Figure 3:
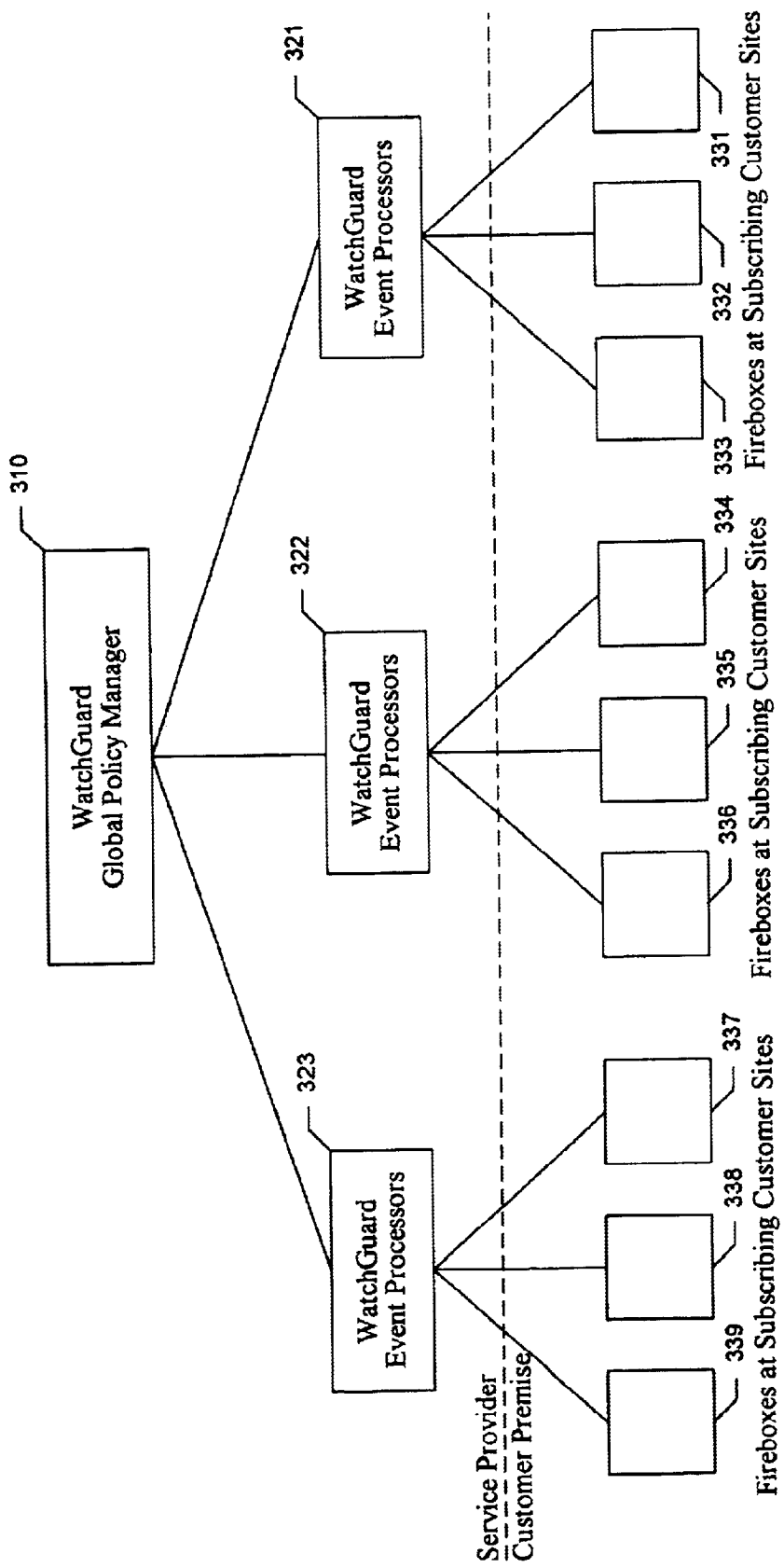
FIG. 3 is a high-level block diagram of a computing environment in which the facility may be implemented.

FIG. 3 is a high-level block diagram of a computing environment in which the facility may be implemented. The diagram shows network security devices 331–339, each protecting a customer network such as the network shown in FIG. 2. These network security devices are operated for the users of these customer networks by a policy manager 310, such as an Internet service provider. The policy manager 310 preferably administers the network security devices via intermediary elements 321–323, called "event processors." It should be noted that, while only nine protected networks are shown in FIG. 3, a global policy manager utilizing the facility may easily configure and administer tens, hundreds, or even thousands of network security devices at a reasonable cost. For additional information on the environment shown in FIG. 3, refer to U.S. patent application No. 09/307,332 entitled "Managing Multiple Network Security Devices From A Manager Device," filed concurrently herewith and hereby incorporated by reference in its entirety.

Figure 4:
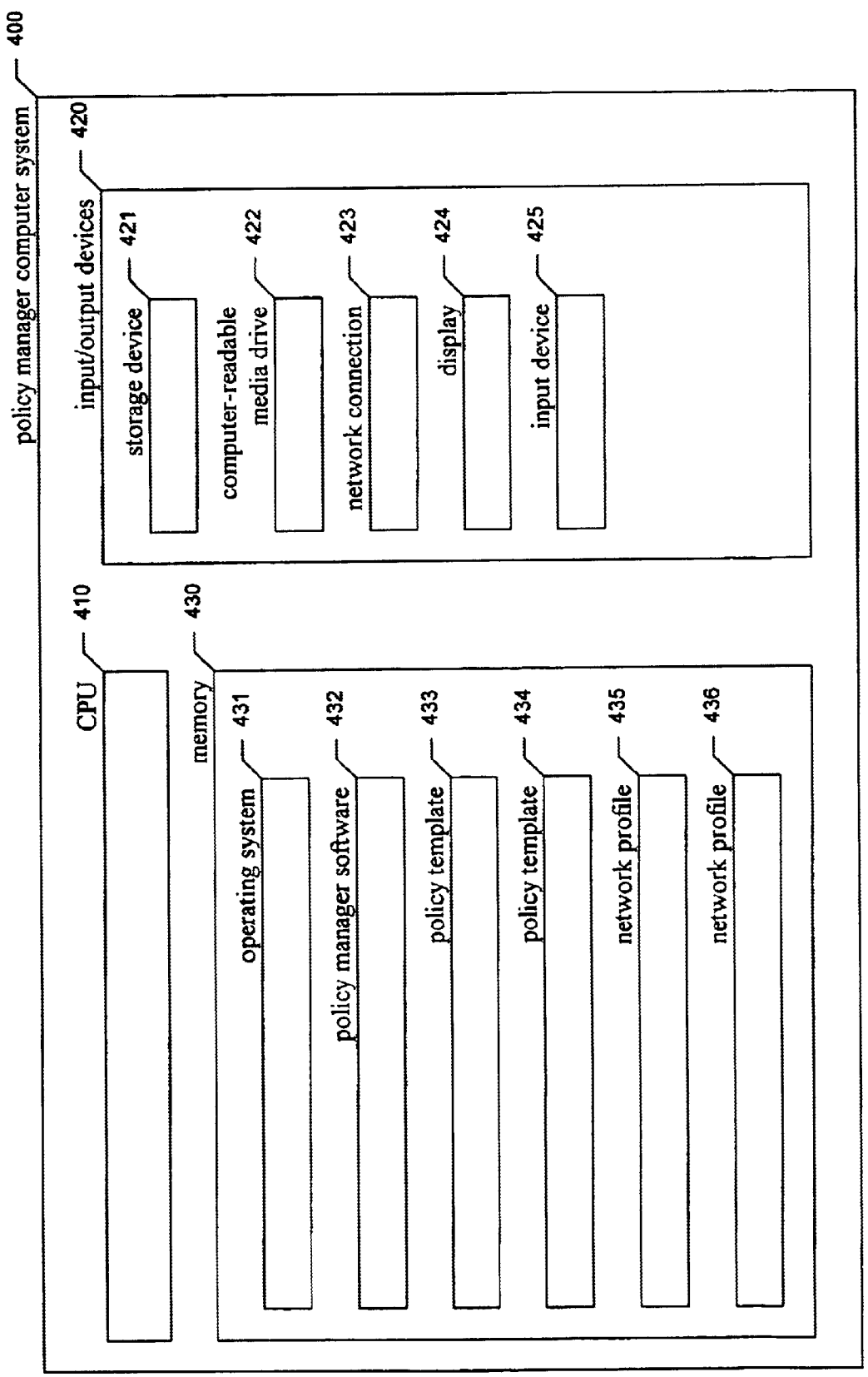
FIG. 4 is a high-level block diagram of the policy manager computer system upon which portions of the facility preferably execute.

FIG. 4 is a high-level block diagram of the policy manager computer system upon which portions of the facility preferably execute. The policy manager computer system 400 contains one or more central processing units (CPUs) 410, input/output devices 420, and a computer memory (memory) 430. Among the input/output devices is a storage device 421, such as a hard disk drive, and a computer-readable media drive 422, which can be used to install software products, including components of the facility, which are provided on a computer-readable medium, such as a CD-ROM. The input/output devices also include a network connection 423, through which the policy manager computer system 400 may communicate with other connected computer systems, such as network security devices. The memory 430 preferably contains an operating system 431, such as MICROSOFT WINDOWS NT or SUN SOLARIS, for providing to other programs access to resources of the computer system. The memory 430 preferably further contains policy manager software 432, which implements aspects of the facility. The memory 430 preferably also contains policy templates 433 and 434 generated with the facility, as well as network profiles 435 and 436 generated by the facility. While the facility is preferably implemented on a computer system configured as described above, those skilled in the art will recognize that it may also be implemented on computer systems having different configurations.

Figure 5:
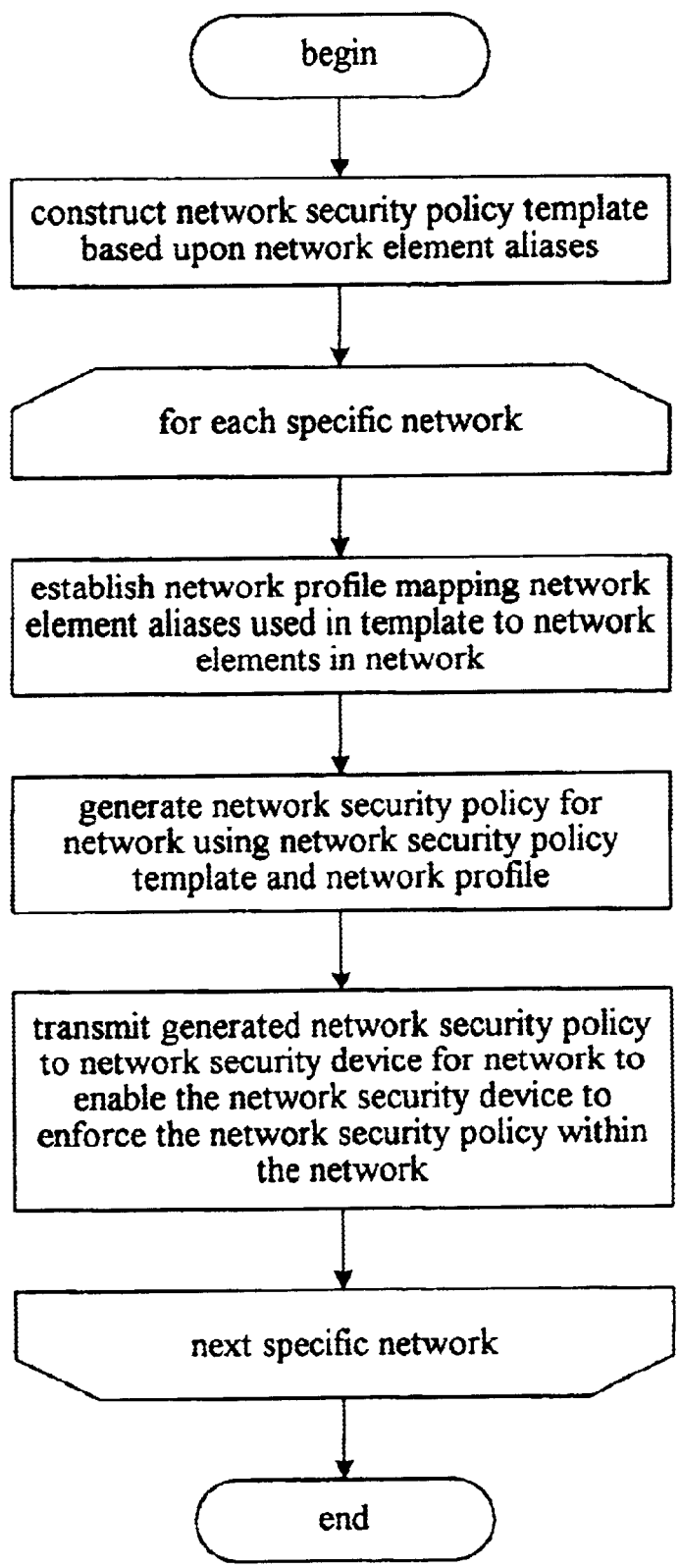
FIG. 5 is a flow diagram showing, at a high level, the steps preferably performed by the facility in order to generate and implement network security policies for a number of protected networks.

FIG. 5 is a flow diagram showing, at a high level, the steps preferably performed by the facility in order to generate and implement network security policies for a number of protected networks. In step 501, the facility constructs a template based upon aliases for certain network elements. The template constructed in step 501 is expressed in terms of rules for network elements rather than in terms of rules for specific network elements of a particular network, and thus may be applied to a number of different networks. In steps 502–506, the facility loops through each of a number of particular networks. In step 503, the facility establishes a network profile mapping the network element aliases used in the template constructed in step 501 to network elements of the current network acting in the roles of the aliases. In step 504, the facility generates a network security policy for the current network using the template generated in step 501 and the network profile generated for the current network in step 503. In step 505, the facility transmits the generated network security policy to the network security device for the current network to enable the network security device to enforce the network security policy within the network. In step 406 if additional networks remain, then the facility continues to step 502 to process the next network, else the steps conclude.

In order to further describe the facility, its operation is discussed below with respect to an example depicted in FIGS. 6–22. The example shows the generation of templates, network profiles, and ultimately policies.

Figure 6:
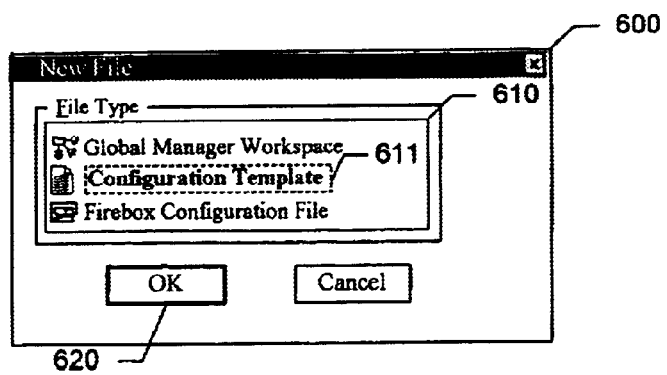
FIG. 6 is a display diagram showing the creation of a template.

FIGS. 6–16 show the generation of templates. FIG. 6 is a display diagram showing the creation of a template. The facility displays a window 600 containing a list 610 of objects that can be created. In this window, the user selects item 611 and OK button 620 in order to create a new template.

Figure 7:
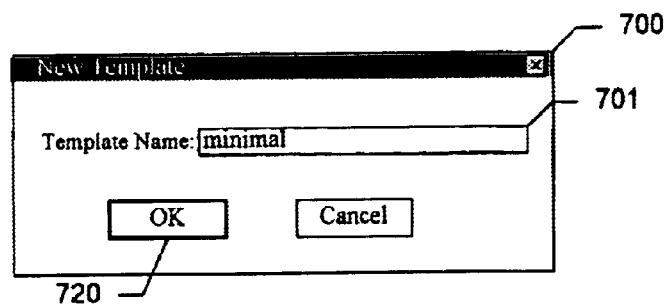
FIG. 7 is a display diagram showing the naming of a new template.

FIG. 7 is a display diagram showing the naming of a new template. The facility displays window 700 which contains a name field 701. The user types the name "minimal" in the name field 701 and selects OK button 720 in order to name the new template "minimal."

Figure 8:
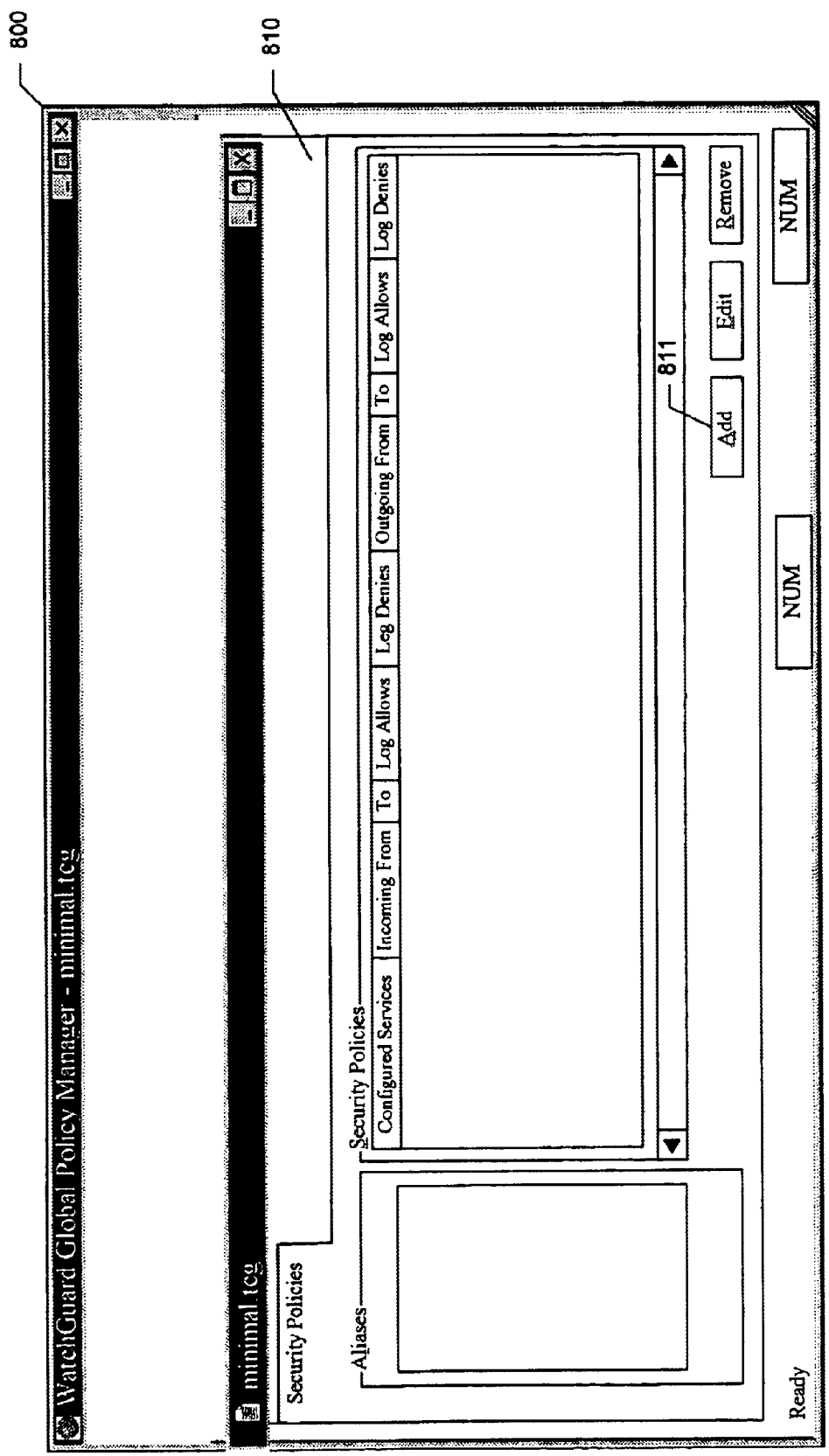
FIG. 8 is a display diagram showing the policy manager user interface.

FIG. 8 is a display diagram showing the policy manager user interface. The facility displays a policy manager window 800, which contains a template window 810 corresponding to the new "minimal" template. In order to add rules to the "minimal" template, the user selects add button 811.

Figure 9:
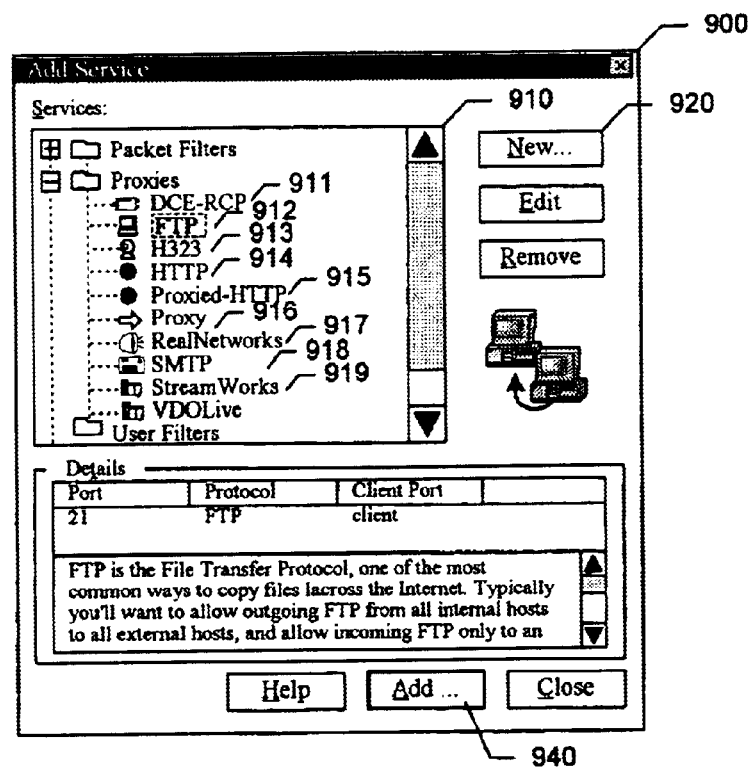
FIG. 9 is a display diagram showing the user interface for adding rules to the template.

FIG. 9 is a display diagram showing the user interface for adding rules to the template. The facility displays window 900, which contains a list 910 of network services each corresponding to one or more potential network security rules. Among these services are services 911–919. The user may select any of the listed services, or may select new button 920 in order to create a new service. In this case, the user has selected the FTP service 912. Once a service is selected, details 930 about the service are displayed in the window 900. For example, as the FTP service 912 was selected, the displayed details 930 refer to the FTP service. In order to add rules corresponding to the FTP service to the rules of the "minimal" template, the user selects an Add button 940.

Figure 10:
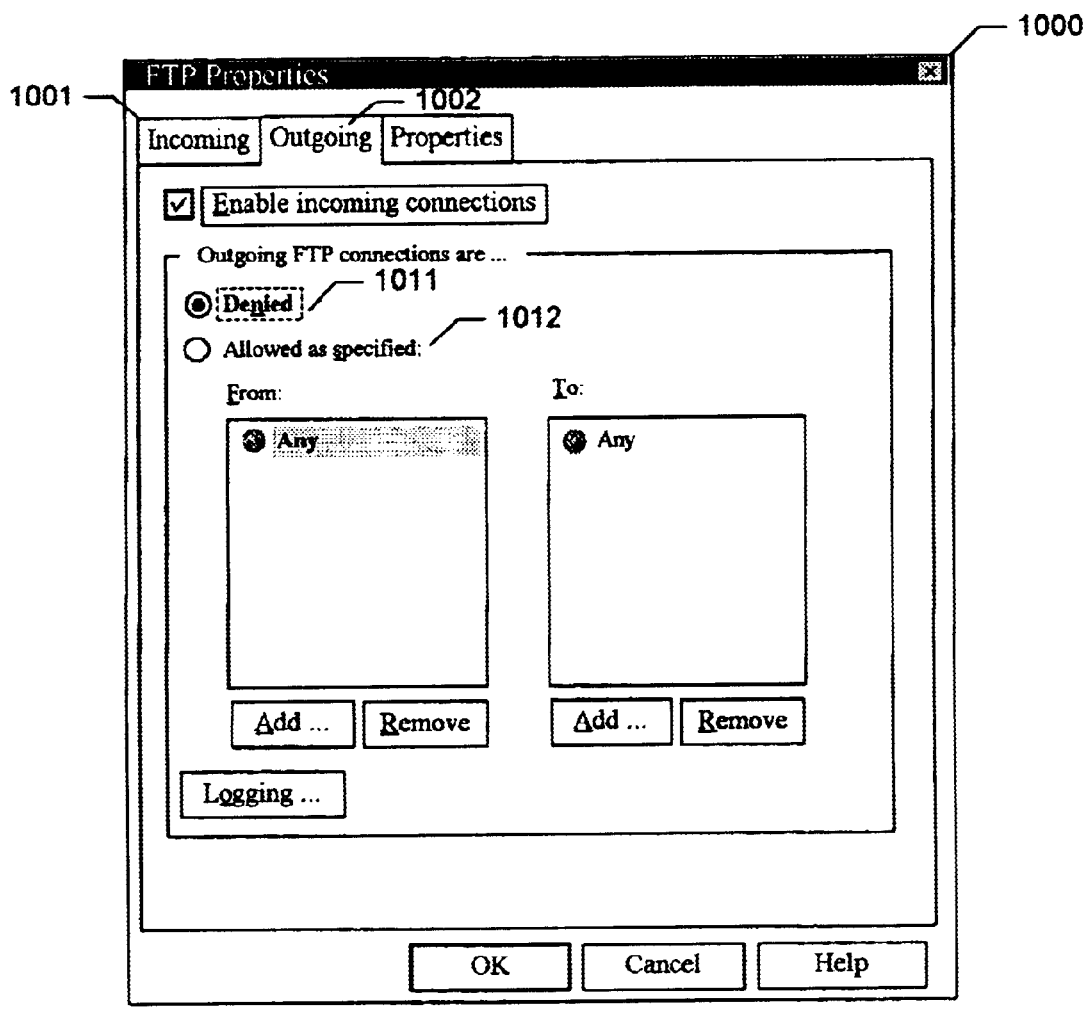
FIG. 10 is a display diagram showing the user interface for specifying rules relating to the FTP network service.

FIG. 10 is a display diagram showing the user interface for specifying rules relating to the FTP network service. The facility displays window 1000, which contains tabs 1001 and 1002, each having a pane for specifying rules relating to the FTP network service. In FIG. 10, the "outgoing" tab 1002 is selected in order to display the pane relating to outgoing traffic. The window 1000 further includes radio buttons 1011 and 1012 for denying or allowing outgoing FTP connections, respectively. In FIG. 10, radio button 1011 is selected, so that all outgoing FTP connections are denied.

Figure 11:
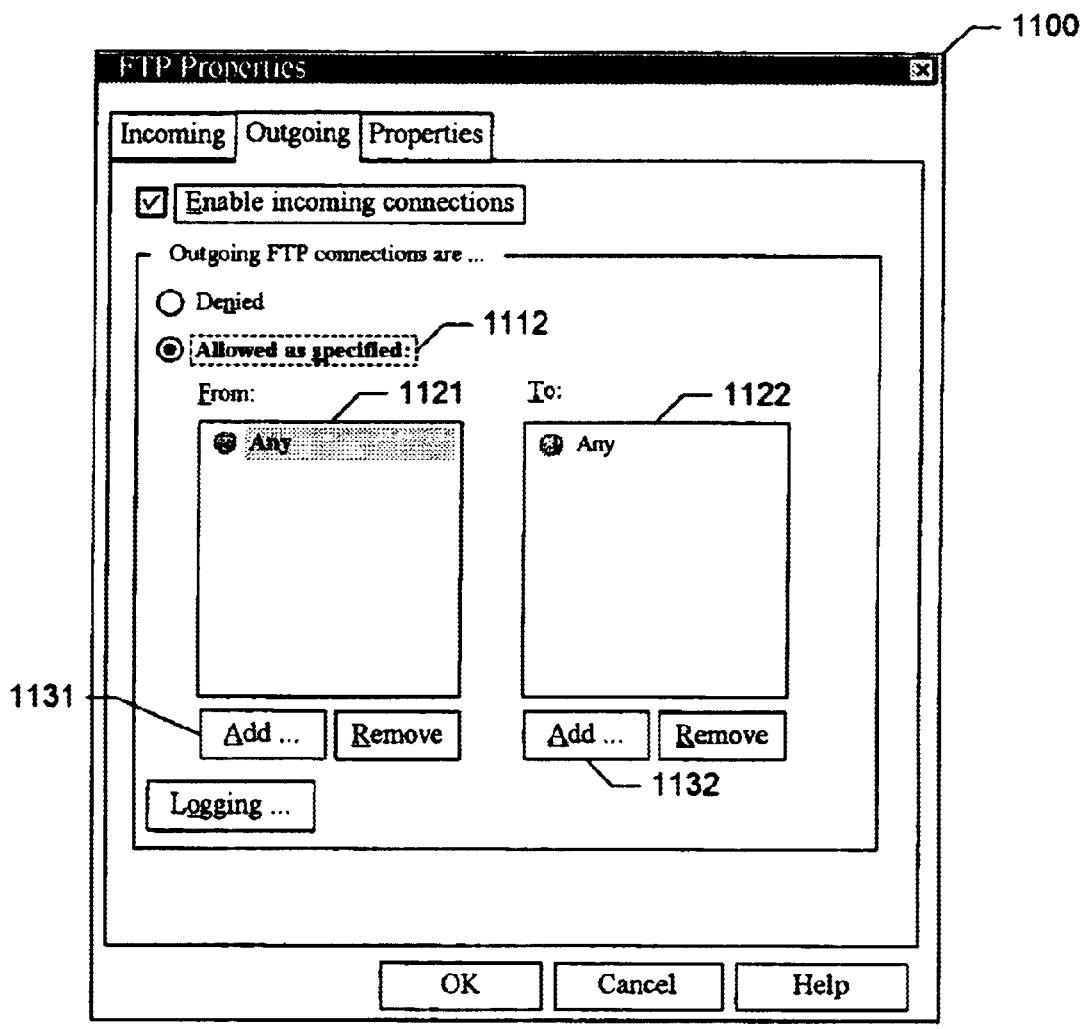
FIG. 11 is a display diagram showing a modification made by the user to allow certain outgoing FTP connections.

FIG. 11 is a display diagram showing a modification made by the user to allow certain outgoing FTP connections. In FIG. 11 it can be seen that the user has selected radio button 1112 in order to allow certain outgoing FTP connections. The contents of lists 1121 and 1122 show that outgoing FTP connections are allowed from any source to any destination. In order to specify particular sources or destinations from or to which FTP requests are allowed, the user may select add button 1131 or 1132, respectively.

Figure 12:
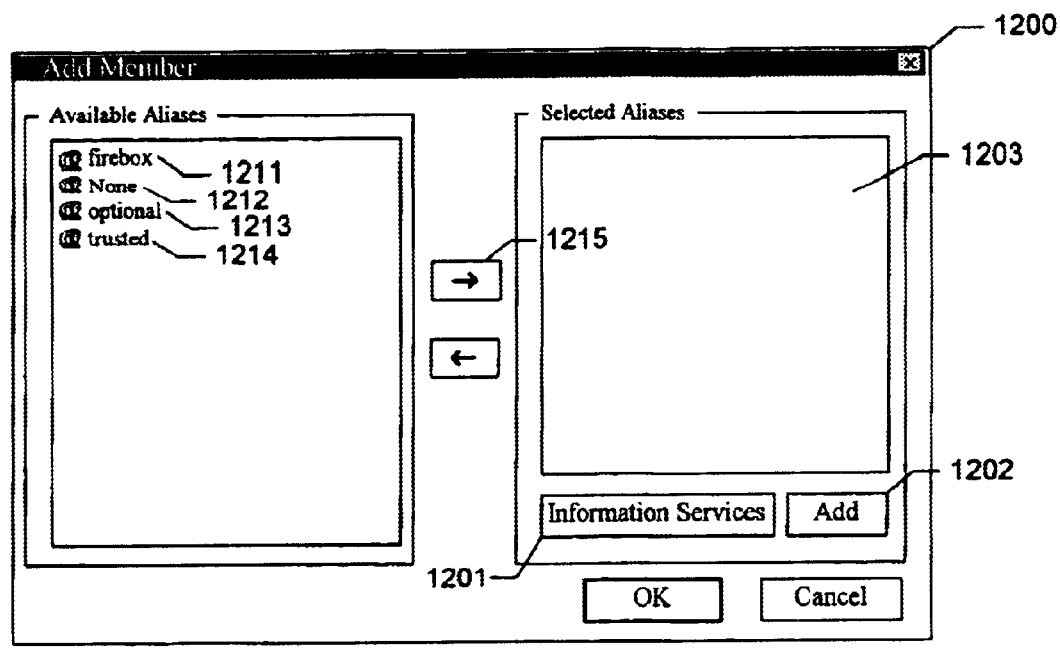
FIG. 12 is a display diagram showing the user interface for adding aliases to the source or destination list for a network service.

FIG. 12 is a display diagram showing the user interface for adding aliases to the source or destination list for outgoing FTP connections. The facility displays window 1200, containing an empty list 1203 of aliases to permit as sources of outgoing FTP connections. Window 1200 provides two methods for adding aliases to list 1203. The first is to select one of the existing aliases 1211–1214, then press Transfer button 1215 to transfer the selected aliases into aliases list 1203. The second method is to type the name of a new alias in new alias field 1201, then select Add button 1202 in order to transfer the new alias name into alias list 1203. In FIG. 12, the user uses the second method in order to add the alias "InformationServices" to the alias list 1203.

Figure 13:
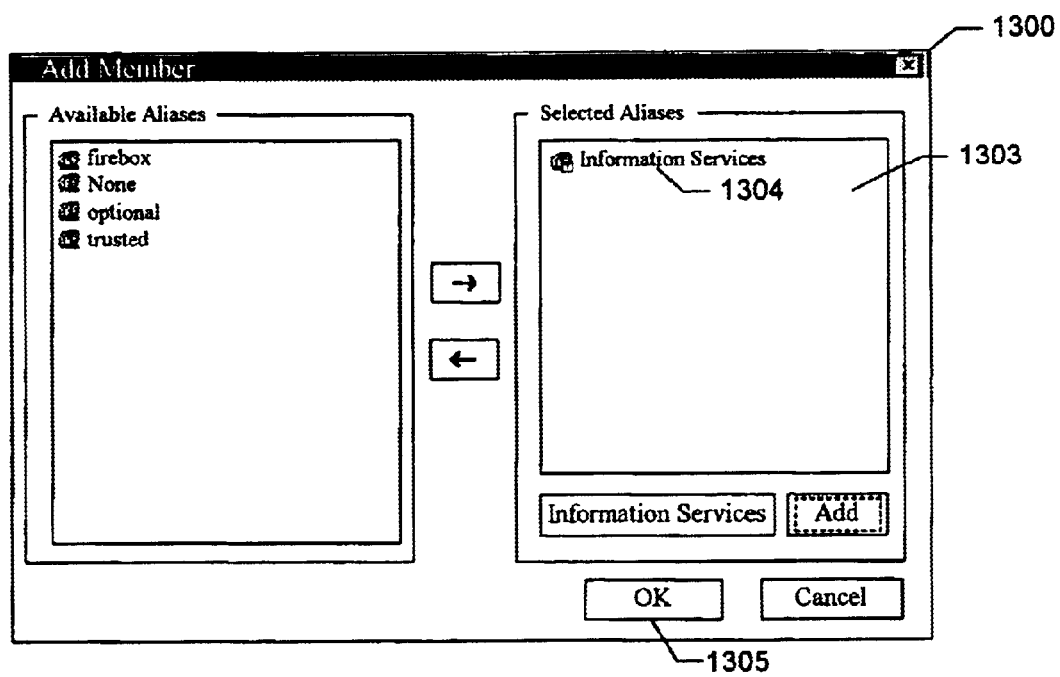
FIG. 13 is a display diagram showing the addition of a new alias to the alias list.

FIG. 13 is a display diagram showing the addition of a new alias to the alias list. It can be seen in FIG. 13 that a new "InformationServices" alias has been added to alias list 1303. At this point, the user selects Okay button 1305 in order to add the aliases listed in alias list 1303 to the list of aliases that may be the source of outgoing FTP connections.

Figure 14:
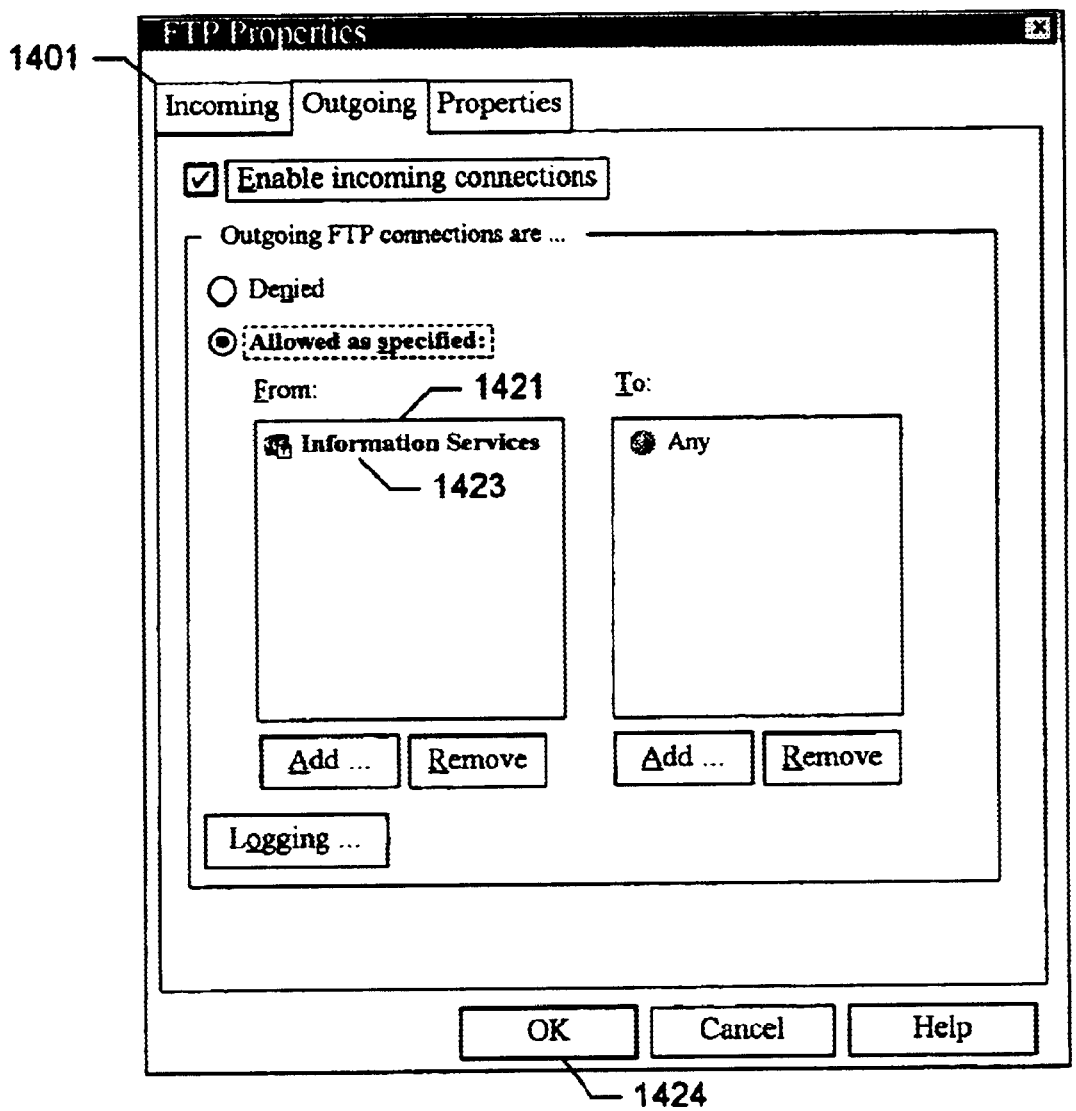
FIG. 14 is a display diagram showing the effect of modifying security rules regarding outgoing FTP connections.

FIG. 14 is a display diagram showing the effect of modifying security rules regarding outgoing FFP connections. It can be seen that the "InformationServices" alias 1423 has been added to the list 1421 from the list of aliases from which outgoing FFP connections are allowed. At this point, the user can select the incoming tab 1401 in order to modify rules for incoming FTP connections. The user may also select Okay button 1424 in order to return to the add service window 900 to add additional network services to the template and modify the rules relating to them.

Figure 15:
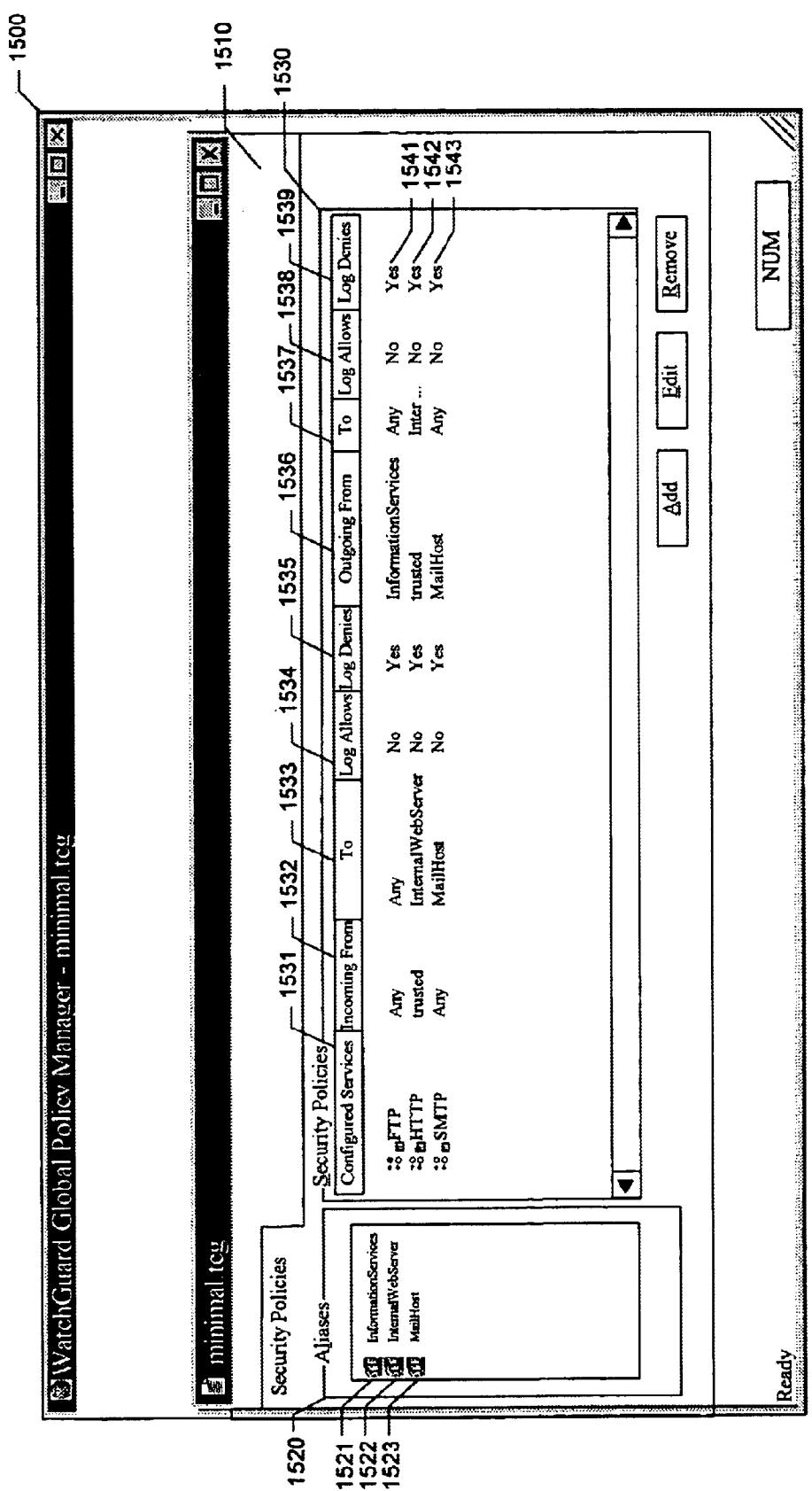
FIG. 15 is a display diagram showing a depiction of the completed "minimal" template.

FIG. 15 is a display diagram showing a depiction of the completed "minimal" template. The policy window 1510 contains a rules table 1530 showing information relating to network security rules making up the template, as well as aliases window 1520 listing the aliases occurring in the rules. Each row of the table 1530 includes an entry in each of a number of columns: a service column 1531 identifying a network service to which the row corresponds; an incoming sources column 1532 identifying sources from which incoming traffic for the service is permitted; an incoming destinations column 1533 identifying destinations to which incoming traffic of the service is permitted; an incoming allowed traffic log column 1534 indicating whether allowed incoming traffic of the service is to be logged; an incoming denied traffic log column 1535 indicating whether denied incoming traffic for the service is to be logged; outgoing traffic source column 1536 identifying sources from which outgoing traffic for the service is permitted; outgoing traffic destination column 1537 identifying destinations to which outgoing traffic for the service is permitted; an allowed outgoing traffic log column 1538 indicating whether allowed outgoing traffic is to be logged; and denied outgoing traffic log column 1539 indicating whether outgoing denied traffic for the service is to be logged. The icons preceding the service name in column 1531 further indicate the extent to which incoming and outgoing traffic is allowed at all for the service in question. The aliases list 1520 lists an "InformationServices" alias 1521 for the computers of members of the information services department; an "InternalWebServer" alias 1522 for the internal web server computer system; and a "MailHost" alias 1523 for the mail host computer system. Occurrences of these aliases can be seen in the table 1530.

The table 1530 represents the substance of the "minimal" template. In a sense, the table constitutes a data structure storing this template. Those skilled in the art will recognize that such a template may be stored in data structures having a variety of different formats.

Now that the "minimal" template is complete, it can be used by the facility to generate policies for particular networks. As part of the example, the user repeats the template generation process to generate two additional templates.

Figure 16:
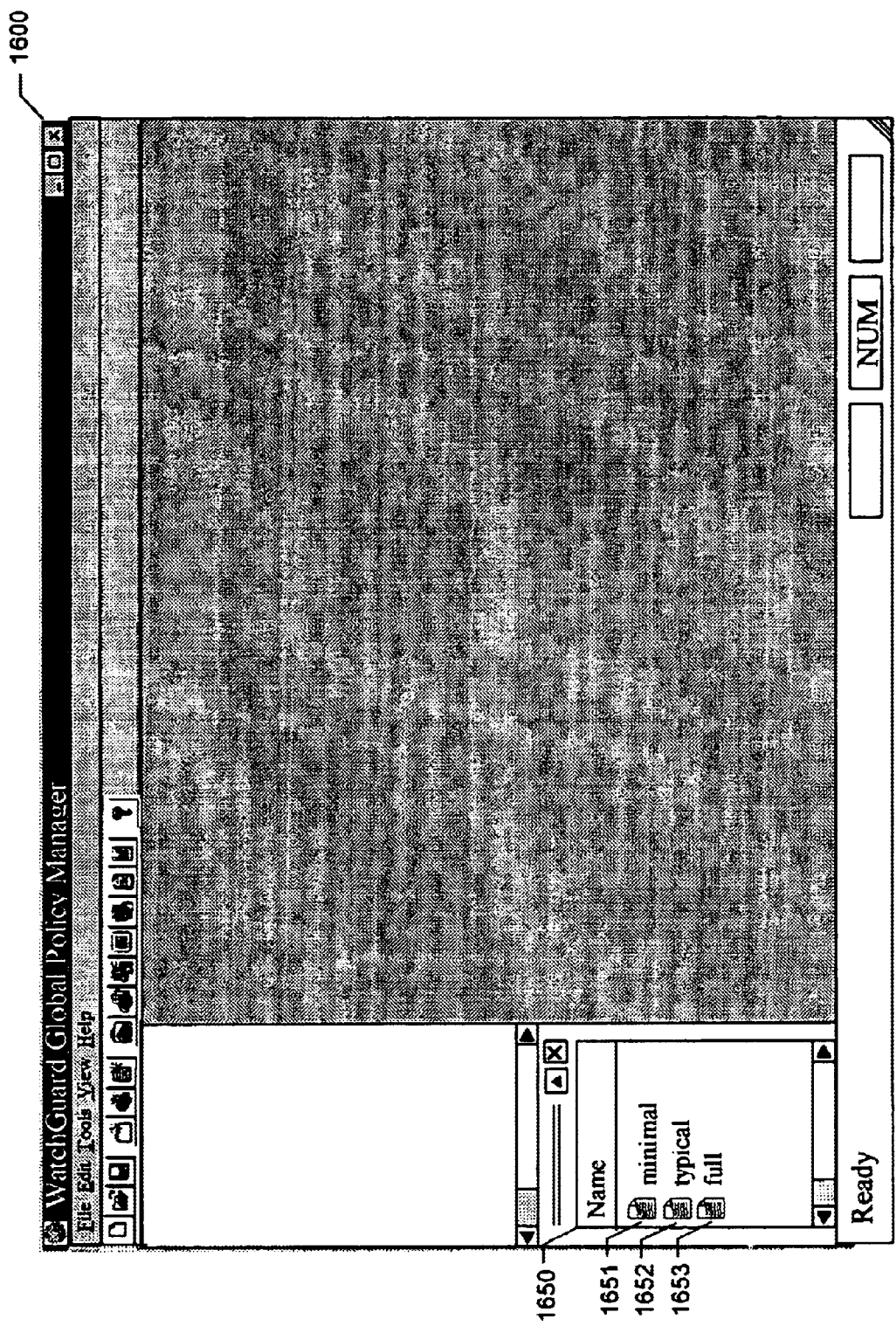
FIG. 16 is a display diagram showing a list of several generated templates.

FIG. 16 is a display diagram showing a list of several generated templates. Policy manager window 1600 contains a template list 1650. Included in the template list are the "minimal" template 1651 generated as shown in FIGS. 6–15, as well as additional "typical" and "full" templates 1652 and 1653 that were generated in the similar manner. Each of the templates is preferably designed to correspond to a different set of security services provided by the operators of the policy manager. When a new network must be protected by a network security device, the network security device may be configured using any of the existing templates. FIGS. 17–22 show the configuration of a new network security device.

Figure 17:
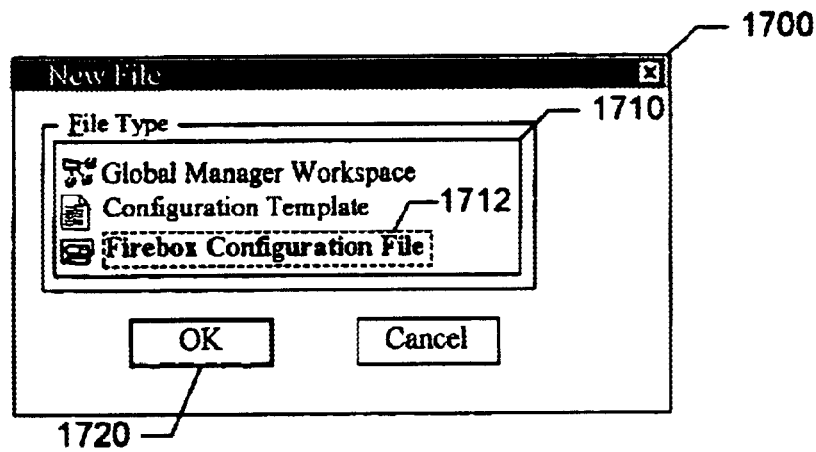
FIG. 17 is a display diagram showing a user interface for configuring a new network security device.

FIG. 17 is a display diagram showing a user interface for configuring a new network security device. The facility display window 1700, which contains a list 1710 of items to create. The user here selects network security device configuration item 1712 and then selects Okay button 1720.

Figure 18:
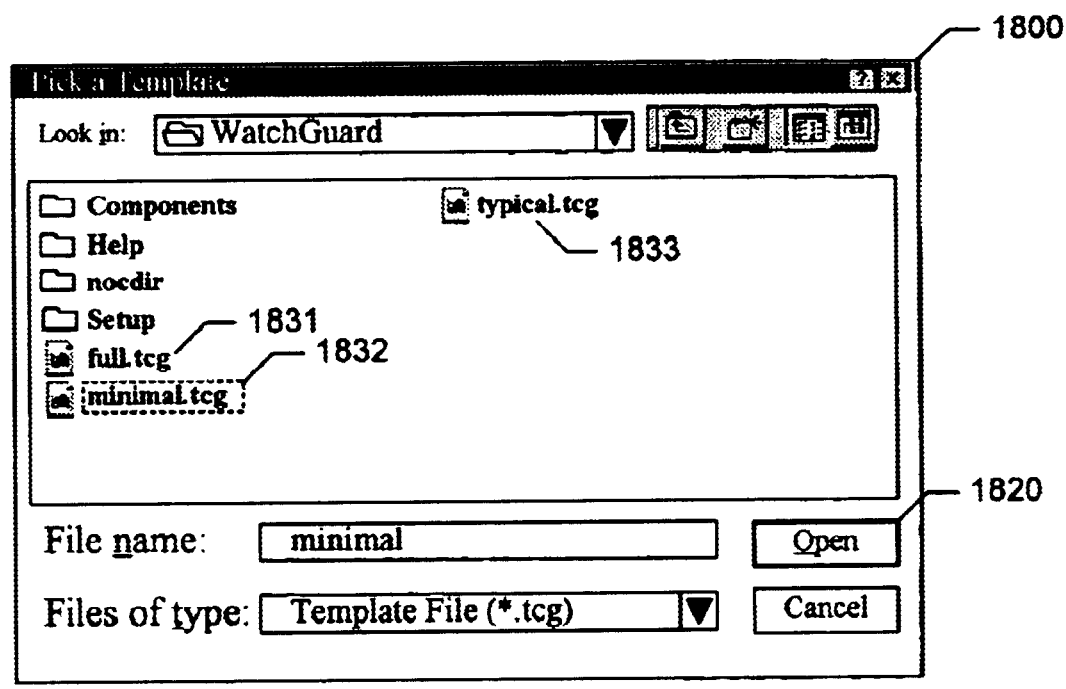
FIG. 18 is a display diagram showing the selection of a template for configuring the new network security device.

FIG. 18 is a display diagram showing the selection of a template for configuring the new network security device. The facility displays window 1800, which contains a list of the three templates 1831–1833. The user selects the "minimal" template 1832, then selects Open button 1820. Alternatively, the user could select one of the three templates from the template list 1650 in the policy manager window 1600.

Figure 19:
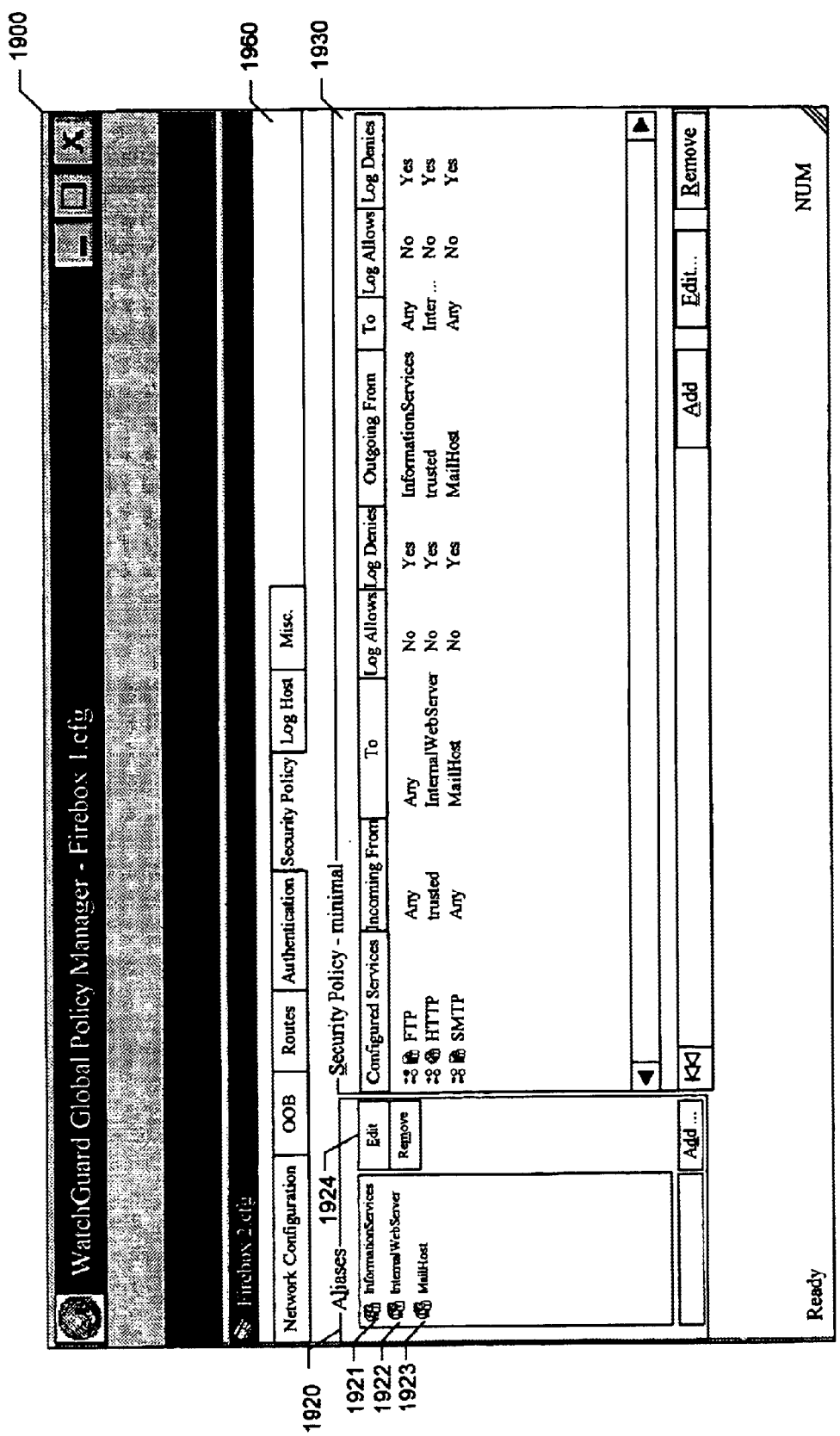
FIG. 19 is a display diagram showing the user interface for generating a network profile for the new network.

FIG. 19 is a display diagram showing the user interface for generating a network profile for the new network. It can be seen that, in addition to service table 1930 and alias list 1920, the network security device configuration window 1960 also includes an Edit button 1924 for mapping the aliases in the alias list to specific network elements within the network protected by the new network security device. In order to do so, the user selects each of the aliases 1921–1923 in turn, selecting the Edit button 1924 to define each.

Figure 20:
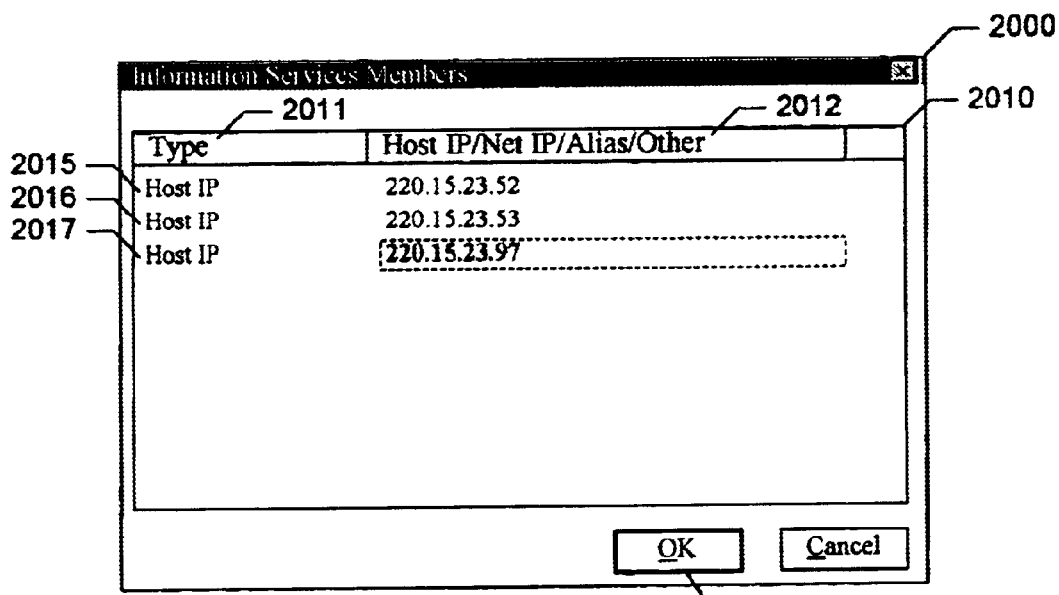
FIG. 20 is a display diagram showing the user interface for defining a first alias within the network profile.

FIG. 20 is a display diagram showing the user interface for defining a first alias within the network profile. When the user selects the "InformationServices" alias 1921, then the Edit button 1924, the facility displays window 2000. Window 2000 contains a list 2010 of addresses for each of the network elements defined for the "InformationServices" alias. Here, the user has entered three addresses 2015–2017. In this case, these addresses are those of the computer systems by members of the Information Services department of the company using the protected network. After entering these addresses, the user selects Okay button 2020.

Figure 21:
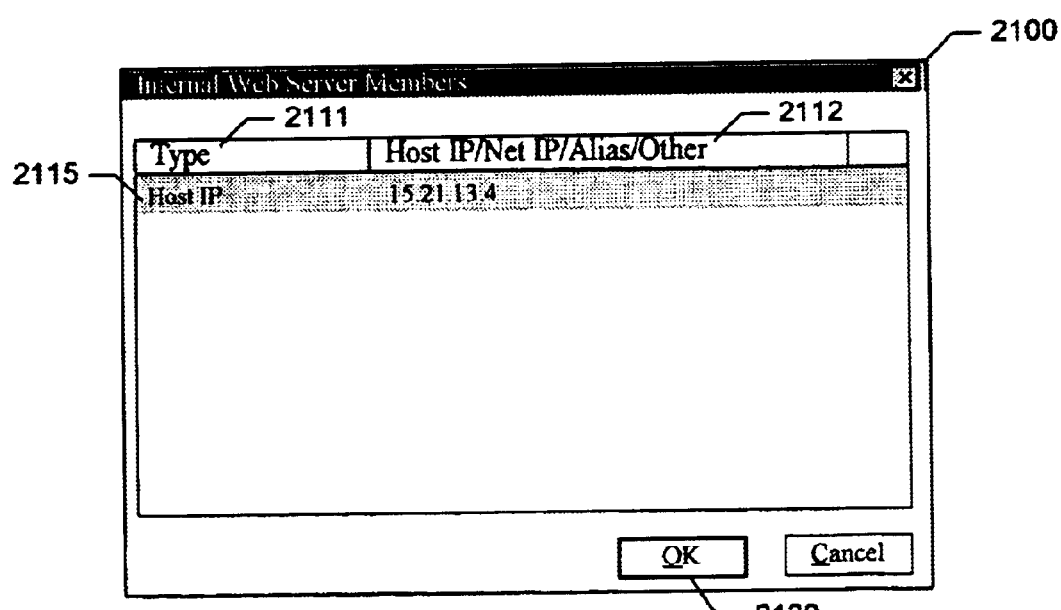
FIG. 21 is a display diagram showing the user interface for defining a second alias within the network profile.

FIG. 21 is a display diagram showing the user interface for defining a second alias within the network profile. In this case, the user has entered a single address 2115 for the "InternalWebServer" alias. This address is the address of the internal web server computer system within the protected network. In order to finalize this list, the user presses Okay button 2120.

After the user defines addresses for each of the aliases in alias list 1920, the user has generated a network profile. The facility preferably proceeds to combine this network profile with the "minimal" template to create a policy for the new network, which it forwards to the network security device in the new network to configure the network security device to implement the policy in the protected network.

Figure 22:
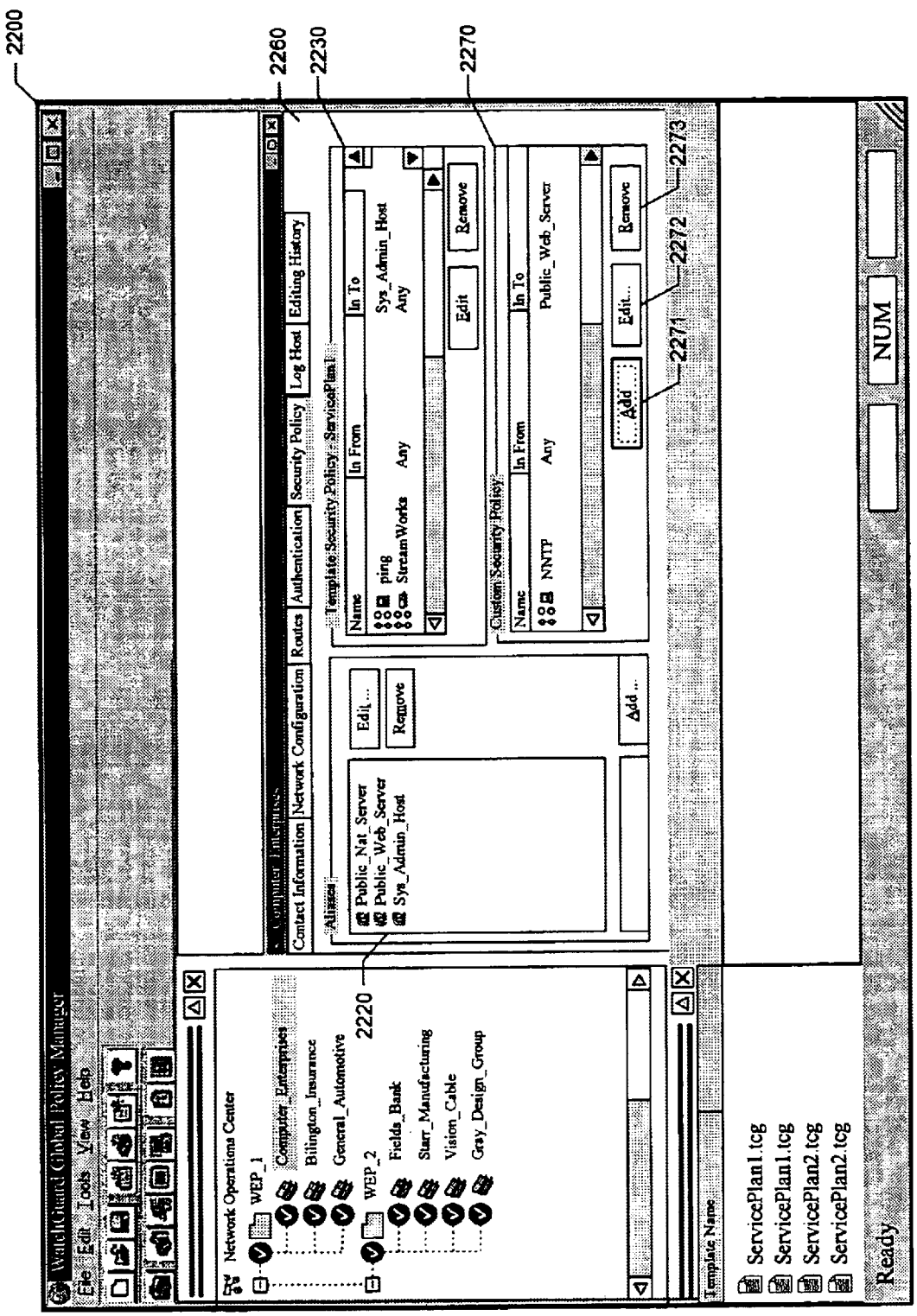
FIG. 22 is a display diagram showing a user interface for adding additional services and rules to the policy generated for the network from the template.

FIG. 22 is a display diagram showing a user interface for adding additional services and rules to the policy generated for the network from the template. It can be seen that, in addition to table 2230 which contains rules defined within the template, the policy window 2260 further contains table 2270, which contains "supplemental" rules included in the policy that are entered separately from the selected template. In order to add rules to this table and modify or remove rules from this table, the user uses controls 2271–2273, and employs a process similar to that described in conjunction with FIGS. 9–14. Supplemental rules may preferably be expressed in terms of the addresses of specific network elements, aliases, or both. Once the user has defined supplemental rules in this manner, the policy used by the network security device for the network constitutes a union of the rules shown in windows 2230 and 2270.

While this invention has been shown and described with reference to preferred embodiments, it will be understood by those skilled in the art that various changes or modifications in form and detail may be made without departing from the scope of the invention. For example, those skilled in the art will recognize that the facility may be straightforwardly adapted to work with other types of security devices in addition to those described herein. Further, the facility may be adapted to use various other user interface techniques and data structures in addition to those described herein. Also, the facility may be straightforwardly adapted to operate in a variety of different types of networking environments.

We claim:

1. A method in one or more computer systems for creating network security policies for providing network security services in a plurality of protected computer networks, each protected network incorporating a plurality of network elements, by:

generating a generalized network security policy that defines one or more rules for conducting network security in a single network, each rule being specified relative to classes of network elements;

for each protected network,
generating a network profile identifying the network elements within the protected network that are members of the classes of the generalized network security policy; and
from the generalized network security policy and the network profile for the protected network, generating a specific network security policy that defines one or more rules for conducting network security in the protected network, each rule being specified relative to network elements within the protected network.

2. The method of claim 1 wherein one of the rules defined by the generated generalized network security policy is an access control rule.

3. The method of claim 1 wherein one of the rules defined by the generated generalized network security policy is a network access translation rule.

4. The method of claim 1 wherein one of the rules defined by the generated generalized network security policy is a traffic logging rule.

5. The method of claim 1 wherein one of the rules defined by the generated generalized network security policy is a notification rule.

6. The method of claim 1 wherein one of the rules defined by the generated generalized network security policy is a request blocking rule.

7. The method of claim 1, further comprising:
modifying the generated generalized network security policy; and
for each protected network,
from the modified generalized network security policy and the network profile for the protected network, generating a new specific network security policy that defines one or more rules for conducting network security in the protected network.

8. The method of claim 1, further comprising the steps of, for a selected protected network, supplementing the specific network security policy with an additional rule specified relative to network devices of the selected protocol network.

9. The method of claim 8 wherein the additional rule is specified relative to dynamic groups of network devices of the selected protected network.

10. The method of claim 8, further comprising:
modifying the generated network security policy;
from the modified network security policy and the network profile for the selected protected network, generating a new specific network security policy for the selected protected network; and
supplementing the new specific network security policy for the selected protected network with the additional rule.

11. The method of claim 1 wherein the each protected network incorporates a network security device for providing network security services in the protected network,
the method further comprising, for each protected network, using the specific network security policy generated for the protected network to configure the network security device for the network.

12. A computer-readable medium whose contents cause one or more computer systems to create network security policies for providing network security services in a plurality of computer networks, each network incorporating a plurality of network elements, by:

generating a network security policy template that defines one or more rules for conducting network security in a single network, each rule being specified relative to classes of network elements;

for each network,
- generating a network profile identifying the network elements within the network that are members of the classes of the network security policy template; and
- from the network security policy template and the network profile for the network, generating a network security policy that defines one or more rules for conducting network security in the network, each rule being specified relative to network elements within the network.

13. The computer-readable medium of claim 12 wherein the contents of the computer-readable medium further cause the computer systems to:

modify the generated network security policy template; and for each network,
- from the modified network security policy template and the network profile for the network, generate a new network security policy that defines one or more rules for conducting network security in the network.

14. A computer environment for developing a network security policy for a protected network, comprising:

a memory having a network security policy template allocation and a network profile allocation,
- the security policy template allocation containing a security policy template defining network security directives expressed relative to network elements having specified roles, and
- the network profile allocation containing a network profile identifying, for each of a plurality of the roles specified in the security policy template, one or more network elements in the protected network having the specified role; and one or more processors that merge the network security policy template contained by the network security policy allocation with the network profile contained by the network profile allocation to produce a network security policy for the protected network.

15. The computer environment of claim 14, further comprising:

a network security device for implementing the network security policy produced by the processor.

16. The computer environment of claim 15, further comprising:

a secure communications subsystem for communicating the network security policy produced by the processor to the network security device.

\* \* \* \* \*

UNITED STATES PATENT AND TRADEMARK OFFICE
CERTIFICATE OF CORRECTION

PATENT NO. : 6,738,908 B1
DATED : May 18, 2004
INVENTOR(S) : David Wayne Bonn

It is certified that error appears in the above-identified patent and that said Letters Patent is hereby corrected as shown below:

Column 2,
Line 8, delete "25" between "or" and "more";

Signed and Sealed this

Seventeenth Day of August, 2004

JON W. DUDAS
*Acting Director of the United States Patent and Trademark Office*